(12) United States Patent
Shirakawa

(10) Patent No.: US 9,507,018 B2
(45) Date of Patent: Nov. 29, 2016

(54) DETECTION AND RANGING APPARATUS AND RANGING METHOD

(71) Applicant: FUJITSU LIMITED, Kawasaki-shi (JP)

(72) Inventor: Kazuo Shirakawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 635 days.

(21) Appl. No.: 13/855,183

(22) Filed: Apr. 2, 2013

(65) Prior Publication Data

US 2013/0300596 A1    Nov. 14, 2013

(30) Foreign Application Priority Data

May 11, 2012 (JP) ................. 2012-109967

(51) Int. Cl.
*G01S 13/42* (2006.01)
*G01S 3/74* (2006.01)

(52) U.S. Cl.
CPC . *G01S 13/42* (2013.01); *G01S 3/74* (2013.01)

(58) Field of Classification Search
CPC ............ G01S 3/00; G01S 3/143; G01S 3/16; G01S 3/18; G01S 3/26
USPC ................................. 342/146, 417
See application file for complete search history.

(56) References Cited

U.S. PATENT DOCUMENTS

| | | | | |
|---|---|---|---|---|
| 5,892,700 A | * | 4/1999 | Haardt ................ | G01S 3/46 708/801 |
| 2007/0285315 A1 | * | 12/2007 | Davis .................... | H01Q 21/22 342/377 |
| 2008/0252526 A1 | * | 10/2008 | Ferreol ................. | G01S 3/74 342/441 |
| 2009/0009394 A1 | * | 1/2009 | Mestre Pons ........ | G01S 3/74 342/417 |
| 2010/0019954 A1 | * | 1/2010 | Mizutani ............... | G01S 3/74 342/147 |
| 2010/0271254 A1 | * | 10/2010 | Kanamoto ............ | G01S 3/74 342/27 |
| 2012/0268316 A1 | * | 10/2012 | Kanamoto ............ | G01S 3/74 342/158 |

FOREIGN PATENT DOCUMENTS

JP      2012-088236      5/2012

OTHER PUBLICATIONS

Nan-Jun Li et al.: "Simple and Efficient Cross-Correlation Method for Estimating 2-D Direction of Arrival", 5th International Conference on Wireless Communications, Networking and Mobile Computing, 2009. WICOM '09. IEEE, Sep. 24, 2009, pp. 1-4, XP031553665.*

(Continued)

*Primary Examiner* — Gregory C Issing
*Assistant Examiner* — Helena Seraydaryan
(74) *Attorney, Agent, or Firm* — Fujitsu Patent Center

(57) ABSTRACT

An apparatus includes a first array including sensors; a second array including sensors that are not collinear with the sensors of the first array except for a sensor that defines the origin of a spatial phase; and a signal processing unit that generates covariance matrices including a first covariance matrix and a second covariance matrix based on reflected waves received by the first and second arrays from targets, estimates first angles of the targets based on the first covariance matrix, reproduces an angle matrix based on the estimated first angles, performs triangular decomposition on the product of a generalized inverse matrix of the angle matrix and the second covariance matrix to obtain a matrix, constructs a similarity transformation problem from submatrices of the obtained matrix, and estimates second angles of the targets based on the estimated first angles and solutions of the similarity transformation problem.

5 Claims, 5 Drawing Sheets

(56) References Cited

OTHER PUBLICATIONS

Palamasy P. et al.: "Two-dimensional DOA Estimation of Coherent Signals Using Acoustic Vector Sensot Array", Signal Processing, Elsevier Science Publishers B.V. Amsterdam, NL, vol. 92, No. 1, May 31, 2011, XP028276354, ISSN: 0165-1684, DOI: 10.1016/J.SIGPRO.2011.05.021.*

Swindlehurst, A. et al., "Azimuth/Elevation Direction Finding Using Regular Array Geometories", IEEE Transactions on Aerospace and Electronic Systems, vol. 29, No. 1, Jan. 1993, pp. 145-156.

Li, Nan-Jun et al., "Simple and Efficient Cross-Correlation Method for Estimating 2-D Direction of Arrival," Wireless Communications, Networking and ,Mobile Computing, 5th International Conference on, IEEE, Sep. 24, 2009, pp. 1-4, XP031553665.

Palanisamy, P. et al., "Two-dimensional DOA estimation of coherent signals using acoustic vector sensor array," Signal Processing, vol. 92, No. 1, May 31, 2011, pp. 19-28, XP028276354.

Extended European Search Report dated Jul. 31, 2013 for corresponding European Application No. 13161238.4.

JPOA—Office Action mailed on Mar. 29, 2016 issued with respect to the basic Japanese Patent Application No. 2012-109967, with partial English translation.

EPOA—European Office Action mailed on May 6, 2016 issued with respect to the correspondng European Patent Application No. 13161238.4.

\* cited by examiner

DETECTION AND RANGING APPARATUS AND RANGING METHOD

CROSS-REFERENCE TO RELATED APPLICATION

This application is based upon and claims the benefit of priority of Japanese Patent Application No. 2012-109967 filed on May 11, 2012, the entire contents of which are incorporated herein by reference.

FIELD

The embodiments discussed herein are related to an apparatus for detecting a received signal.

BACKGROUND

There exists a direction-of-arrival estimation apparatus that measures two types of angle information such as an azimuth and an elevation at the same time (see, for example, A. Swindlehurst and T. Kailath, "Azimuth/Elevation Direction Finding Using Regular Array Geometories" IEEE Trans. on AES, Vol. 29, No. 1, pp. 145-156, January 1993). Such a direction-of-arrival estimation apparatus, for example, obtains two-dimensional spatial phase information of an incoming signal using a grid array sensor. The direction-of-arrival estimation apparatus performs known calculations on the two-dimensional spatial phase information of the incoming signal and thereby estimates two types of angle information, i.e., an azimuth and an elevation.

FIG. 1 illustrates an exemplary arrangement of sensors of a direction-of-arrival estimation apparatus (hereafter, "sensor" is synonymously used with "antenna").

In the exemplary arrangement of antennas of the direction-of-arrival estimation apparatus illustrated in FIG. 1, it is assumed that a target exists in the positive direction of the Y-axis. Element antennas are arranged at points on the X-Z plane to form an array antenna (hereafter, those points are represented by lattice points for brevity).

With the origin as the center (although the origin coordinate values are set at (x,y)=(1,1)), there are N coordinate points in the positive direction of the X-axis (N is an integer greater than or equal to 1) and M coordinate points in the positive direction of the Z-axis (M is an integer greater than or equal to 1). That is, there are N×M lattice points in total. In FIG. 1, each element antenna is represented by $A_{nm}$. Element antennas $A_{nm}$ are not necessarily arranged at regular intervals. When intervals dx and dz are the greatest common divisor among all element-to-element spacing along X and Z axes, it can be assumed that antennas arranged at regular intervals and antennas arranged at random intervals are both arranged on lattice points with the intervals dx and dz, and their positions can be handled in a similar manner.

In FIG. 1, it is also assumed that an angle measured clockwise from the positive direction of the Y-axis is the positive direction of azimuth and an angle measured from the X-Y plane in the positive direction of the Z-axis is the positive direction of elevation. That is, assuming that a source of a radio wave is present at point P in FIG. 1, the azimuth and the elevation of the emitter are indicated by θ and φ.

The direction of arrival of a radio wave to be measured is represented by an angle at which an echo signal (reflected wave), which is generated when a probe signal emitted from an apparatus is reflected by a target, returns to a receive antenna. When the point P is a target position, i.e., the position of the source of an echo signal, the spatial phase of an incoming signal received by an element antenna $A_{nm}$ of the array antenna with reference to $A_{11}$ is represented by formula (1) below.

$$\frac{2\pi}{\lambda}[(n-1)d_x\sin\theta\cos\phi + (m-1)d_z\sin\phi] \quad (1)$$

Accordingly, when $d_x/\lambda = \alpha$ and $d_z/\lambda = \beta$ and $g(\theta, \phi)$ represents the characteristic of each element antenna, the characteristic of the array antenna is represented by formula (2) below.

$$f(\theta, \phi) = \sum_{n,m=1,1}^{N,M} g_{nm}(\theta, \phi)\exp\{-j2\pi[(n-1)\alpha\sin\theta\cos\phi + (m-1)\beta\sin\phi]\} \quad (2)$$

Here, $g_{nm}(\theta, \phi)$ indicates the characteristic (e.g., gain) of an element antenna $A_{nm}$, and λ indicates the wavelength of a carrier signal.

Sub-arrays can be obtained from the array antenna having the characteristic represented by formula 2.

FIG. 2 is a drawing used to describe an exemplary method of obtaining sub-arrays. Response matrices (A1 through A4) of sub-arrays A1 through A4 in FIG. 2 can be expressed by formula (3) below using phase offset matrices φ1 and φ2 and the response matrix A1 of the sub-array A1. In formula (3), a matrix A indicates matrices A1 through A4, collectively. However, the matrix A is merely a collection of submatrices and is different from an array response matrix.

$$A \triangleq \begin{bmatrix} A_1 \\ A_2 \\ A_3 \\ A_4 \end{bmatrix} \triangleq \begin{bmatrix} A_1 \\ A_1\Phi_1 \\ A_1\Phi_2 \\ A_1\Phi_1\Phi_2 \end{bmatrix} \quad (3)$$

Angle estimation may be performed by forming a least squares problem represented by formula (4) regarding a transformation matrix T and solving the least squares problem.

$$\varepsilon(T) = \min_T \|E - AT\|^2 \quad (4)$$

The phase offset matrices φ1 and φ2 (in formula (3)) are defined by diagonal matrices represented by formulas (5) and (6). In formulas (5) and (6), subscripts 1 through K indicate target identification numbers.

$$\Phi_1 = \text{diag}[\exp(-j2\pi\beta \sin \phi_1), \ldots, \exp(-j2\pi\beta \sin \phi_K)] \quad (5)$$

$$\Phi_2 = \text{diag}[\exp(-j2\pi\alpha \sin \theta_1 \cos \phi_1), \ldots, \exp(-j2\pi\alpha \sin \theta_K \cos \phi_K)] \quad (6)$$

In formula (4), a matrix E is obtained by extracting submatrices (corresponding to the sub-arrays) from the results obtained by performing eigenvalue decomposition on a covariance matrix of an incoming signal matrix and by arranging the extracted submatrices in concord.

$$E \triangleq \begin{bmatrix} E_1 \\ E_2 \\ E_3 \\ E_4 \end{bmatrix} \quad (7)$$

SUMMARY

According to an aspect of the embodiments of the invention, there is provided a detection and ranging apparatus that includes a first array including plural sensors, a second array including plural sensors that are not collinear with the sensors of the first array except for one of the sensors that defines an origin of a spatial phase, and a signal processing unit. The signal processing unit is configured to generate plural covariance matrices including a first covariance matrix and a second covariance matrix based on reflected waves received by the first array and the second array from targets, estimate first angles of the targets based on the first covariance matrix, reproduce an angle matrix based on the estimated first angles, perform triangular decomposition on a product of a generalized inverse matrix of the reproduced angle matrix and the second covariance matrix to obtain a matrix, construct a similarity transformation problem from submatrices of the obtained matrix, and estimate second angles of the targets based on the estimated first angles and solutions of the similarity transformation problem.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

As described in "Azimuth/Elevation Direction Finding Using Regular Array Geometries" cited above, it is possible to estimate a target angle by solving formula (4) above.

With the related-art method, however, since data itself is a matrix of (N×M)th order, it is necessary to perform calculations (N×M)² times just to obtain a covariance matrix as the first step in an angle estimation process, and the computational load is very high. For example, when N=M, $N^4$ calculations need to be performed.

Since the angle estimation process further includes obtaining a matrix E and estimating angles, the computational load becomes extremely high.

Figure 1:
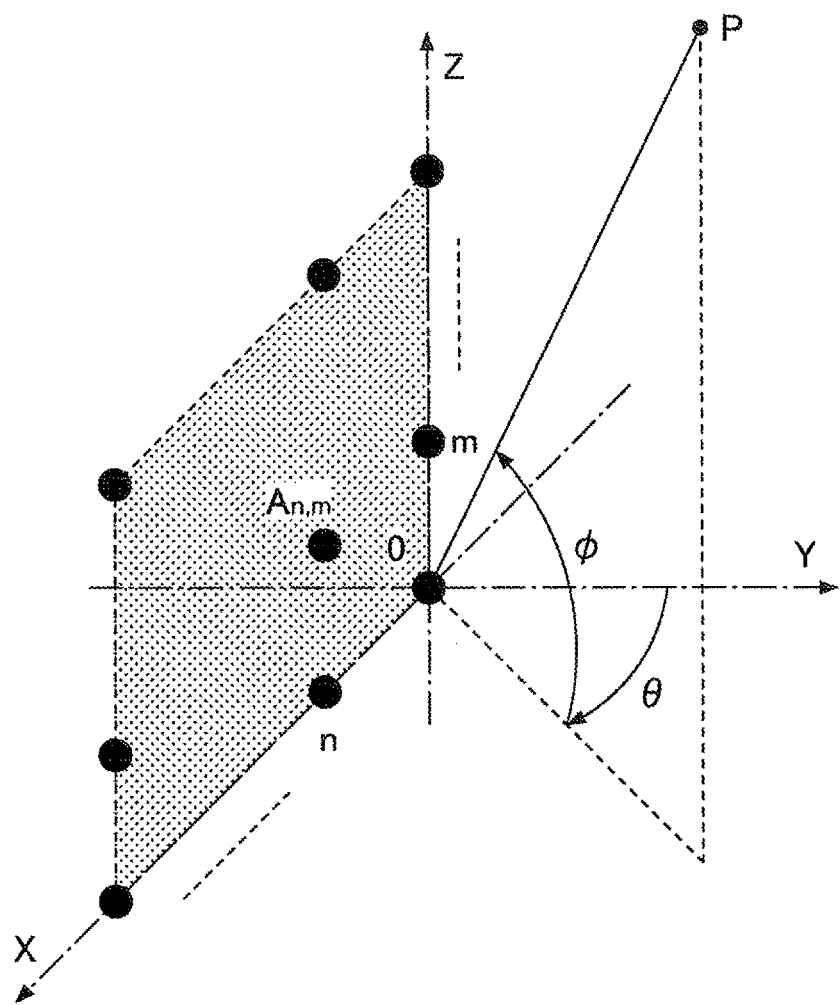
FIG. 1 is a drawing illustrating an exemplary arrangement of antennas of a two-dimensional direction-of-arrival estimation apparatus.
Figure 2:
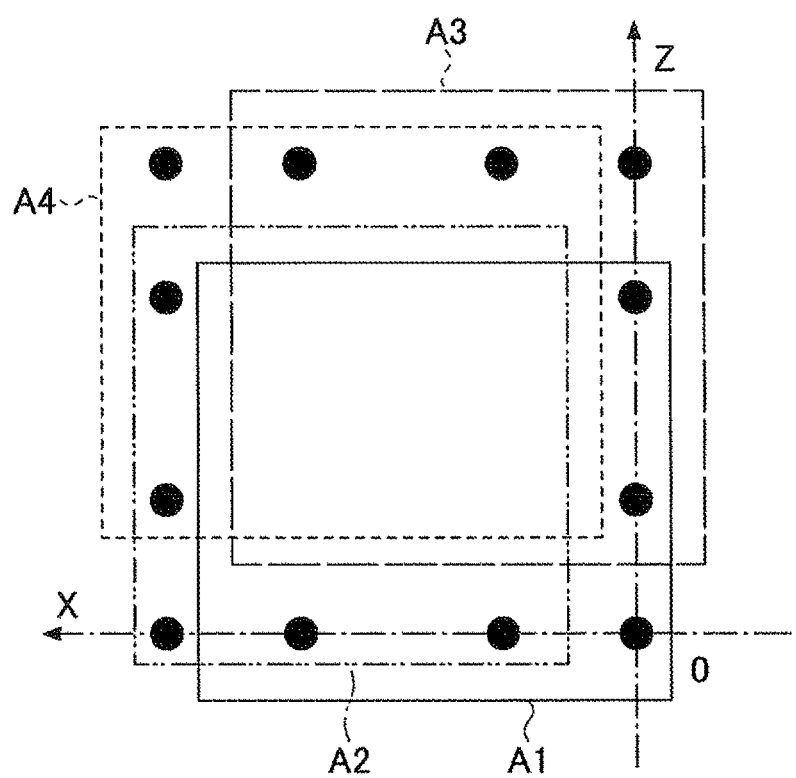
FIG. 2 is a drawing illustrating exemplary sub-arrays of a two-dimensional direction-of-arrival estimation apparatus.

Here, when implementing a direction-of-arrival estimation apparatus to be mounted, for example, in a vehicle where the mounting area is very limited, it is difficult to use a grid array as illustrated in FIG. 1 as hardware. Also, since the computing speed of an in-vehicle CPU is generally very low, it is difficult to employ a related-art computational method as described above.

One aspect of this disclosure makes it possible to provide a detection and ranging apparatus with a reduced mounting area and a ranging method that can estimate the azimuth and the elevation of a target at the same time with a reduced computational load.

Preferred embodiments are described below with reference to the accompanying drawings.

Throughout the accompanying drawings, the same reference numbers are used for components having the same functions, and overlapping descriptions of those components are omitted.

<Detection and Ranging Apparatus>

Figure 3:
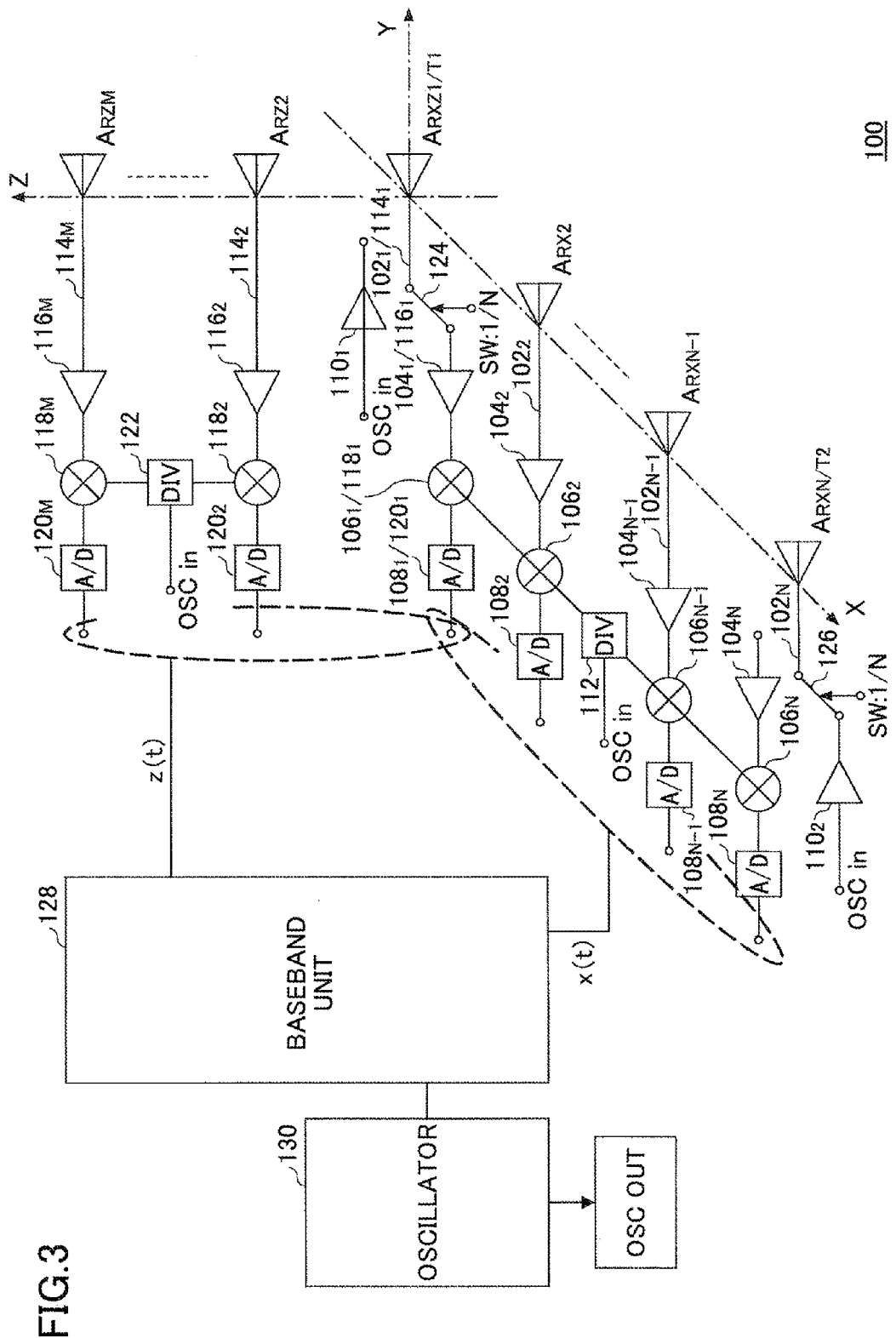
FIG. 3 is a drawing illustrating an exemplary configuration of a detection and ranging apparatus according to an embodiment.

FIG. 3 is a drawing illustrating an exemplary hardware configuration of a detection and ranging apparatus 100 according to an embodiment.

The detection and ranging apparatus 100 includes transceiver elements $102_N$ (N is an integer greater than or equal to 1), amplifiers $104_N$, mixers $106_N$, analog-to-digital (A/D) converters $108_N$, amplifiers $110_1$ and $110_2$, a divider 112, transceiver elements $114_M$ (M is an integer greater than or equal to 1), amplifiers $116_M$, mixers $118_M$, A/D converters $120_M$, a divider 122, switches 124 and 126, a baseband unit (BBU) 128, and an oscillator (OSC) 130.

According to the present embodiment, the transceiver elements $102_1$ through $102_N$ and the transceiver elements $114_1$ through $114_M$ constitute linear arrays. Also, each pair of the transceiver elements $102_1$ and $114_1$, the amplifiers $104_1$ and $116_1$, the mixers $106_1$ and $118_1$, and the A/D converters $108_1$ and $120_1$ is implemented by a common (or shared) element. In other words, the same element is shared by two arrays. The transceiver elements $102_1$ through $102_N$ and the transceiver elements $114_1$ through $114_M$ are sensor elements such as antennas or transducers. With the exception of the common element $102_1/114_1$, the transceiver elements $102_2$ through $102_N$ are not collinear with (not on the same line as) the transceiver elements $114_2$ through $114_M$. In the example of FIG. 3, the transceiver elements $102_2$ through $102_N$ are arranged along the X-axis direction and the transceiver elements $114_2$ through $114_M$ are arranged along the Z-axis direction. More specifically, the transceiver elements $102_2$ through $102_N$ are arranged in the positive direction of the X-axis and the transceiver elements $114_2$ through $114_M$ are arranged in the positive direction of the Z-axis. In other words, the transceiver elements $102_1/114_1$ and $102_2$-$102_N$ and the transceiver elements $102_1/114_1$ and $114_2$-$114_M$ are arranged to form a reversed "L" shape. Alternatively, the transceiver elements $102_1/114_1$ and $102_2$-$102_N$ and the transceiver elements $102_1/114_1$ and $114_2$-$114_M$ may be arranged to form a "+" shape or an "X" shape. In any case, using a common element such as the transceiver element $102_1/114_1$ to define the origin of a spatial phase makes it easier to perform calculations for angle estimation. For this reason, in the present embodiment, a common element is used to define the origin of a spatial phase. Nevertheless, it is also possible to define the origin of a spatial phase using a known technology even when no common element exists.

The values of N and M are preferably determined according to the area occupied by an antenna(s), the circuit size, and the number of targets whose azimuth and elevation are to be estimated. Here, for a general in-vehicle use, priority is given to obtaining azimuth direction information. Therefore, when it is acceptable to transmit probe signals from plural transceiver elements, the effective number of antennas arranged in the X-axis direction to detect azimuth directions may be increased by using an aperture synthesis technology.

Also, in general, the number of measurable targets (i.e., targets whose angles can be measured by the detection and ranging apparatus 100) is proportional to the number of antennas. Therefore, in the descriptions below, it is assumed that N≥M.

The amplifiers $104_N$, the mixers $106_N$, the divider 112, the amplifiers $110_1$ and $110_2$, the A/D converters $108_N$, the amplifiers $116_M$, the mixers $118_M$, the divider 122, and the A/D converters $120_M$ may be implemented by one or more integrated circuits (IC). For example, those elements may be implemented by semiconductor devices such as gallium arsenide (GaAs) devices, complementary metal oxide semiconductor (CMOS) devices, or monolithic microwave integrated circuits (MMIC).

According to an embodiment, the transceiver elements $102_1/114_1$ and $102_N$ are used for both transmission and reception (for example, by time sharing), and the transceiver elements $102_2$-$102_{N-1}$ and $114_2$-$114_M$ are used for reception. Transceiver elements used for transmission and reception and transceiver elements used for reception may be changed as necessary. Also, transceiver elements used for transmission may be provided separately from transceiver elements used for reception.

The transceiver elements $102_1/114_1$ and $102_N$ transmit probe signals. The probe signal may be any one of a high-frequency signal modulated according to a frequency modulated continuous wave (FMCW) scheme, a high-frequency signal modulated according to a spread spectrum scheme, and a radio wave according to a ultra wide band (UWB) technology. Also, the probe signal may not necessarily be a radio wave as long as it is a physical signal supported by transmission and reception sensors. In the present embodiment, it is assumed that the probe signal is a high-frequency signal modulated according to the FMCW scheme.

When the probe signals are to be transmitted from the transceiver elements $102_1/114_1$ and $102_N$, the switches 124 and 126 are connected to the amplifiers $110_1$ and $110_2$, respectively. The switching timing may be determined, for example, according to the modulation scheme of the probe signals and/or whether the probe signals are multiplexed. For example, when the probe signals are multiplexed in the time domain using orthogonal codes, the probe signals may be transmitted from the transceiver elements $102_1/114_1$ and $102_N$ at the same time.

A system reference signal (a high-frequency signal modulated according to the FMCW scheme) from the oscillator 130 is input to the amplifiers $110_1$ and $110_2$ at appropriate timing, amplified by the amplifiers $110_1$ and $110_2$, and transmitted as the probe signals from the transceiver elements $102_1/114_1$ and $102_N$ to a detection space covered by the detection and ranging apparatus 100.

The probe signals transmitted from the transceiver elements $102_1/114_1$ and $102_N$ are reflected by targets. The probe signals reflected by the targets are referred to as "reflected waves" or "echo signals".

When the probe signals are transmitted from the transceiver elements $102_1/114_1$ and $102_N$ and the reception timing of these elements comes, the amplifiers $104_1/116_1$ and $104_N$ are connected via the switches 124 and 126 to the transceiver elements $102_1/114_1$ and $102_N$.

The transceiver elements $102_1/114_1$ and $102_2$-$102_N$ receive echo signals arriving from targets, the amplifiers $104_1/116_1$ and $104_2$-$104_N$ amplify the received echo signals, and the mixers $106_1/118_1$ and $106_2$-$106_N$ mix the amplified echo signals with the system reference signal from the divider 112 and input the mixed signals to the corresponding A/D converters $108_1/120_1$ and $108_2$-$108_N$. The A/D converters $108_1/120_1$ and $108_2$-$108_N$ convert the analog signals (the mixed signals) received from the mixers $106_1/118_1$ and $106_2$-$106_N$ into digital signals, and input the digital signals to the baseband unit 128.

Similarly, when the probe signal is transmitted from the transceiver element $102_1/114_1$ and the reception timing of the transceiver element $102_1/114_1$ comes, the amplifier $104_1/116_1$ is connected via the switch 124 to the transceiver element $102_1/114_1$.

The transceiver elements $102_1/114_1$ and $114_2$-$114_M$ receive echo signals arriving from targets (data obtained by an array arranged on the X-axis may be used for the transceiver element $102_1/114_1$), the amplifiers $104_1/116_1$ and $116_2$-$116_M$ amplify the received echo signals, and the mixers $106_1/118_1$ and $118_2$-$118_M$ mix the amplified echo signals with the system reference signal from the dividers 112 and 122 and input the mixed signals to the corresponding A/D converters $108_1/120_1$ and $120_2$-$120_M$. The A/D converters $108_1/120_1$ and $120_2$-$120_M$ convert the analog signals (the mixed signals) received from the mixers $106_1/118_1$ and $118_2$-$118_M$ into digital signals, and input the digital signals to the baseband unit 128.

<Baseband Unit>

Figure 4:
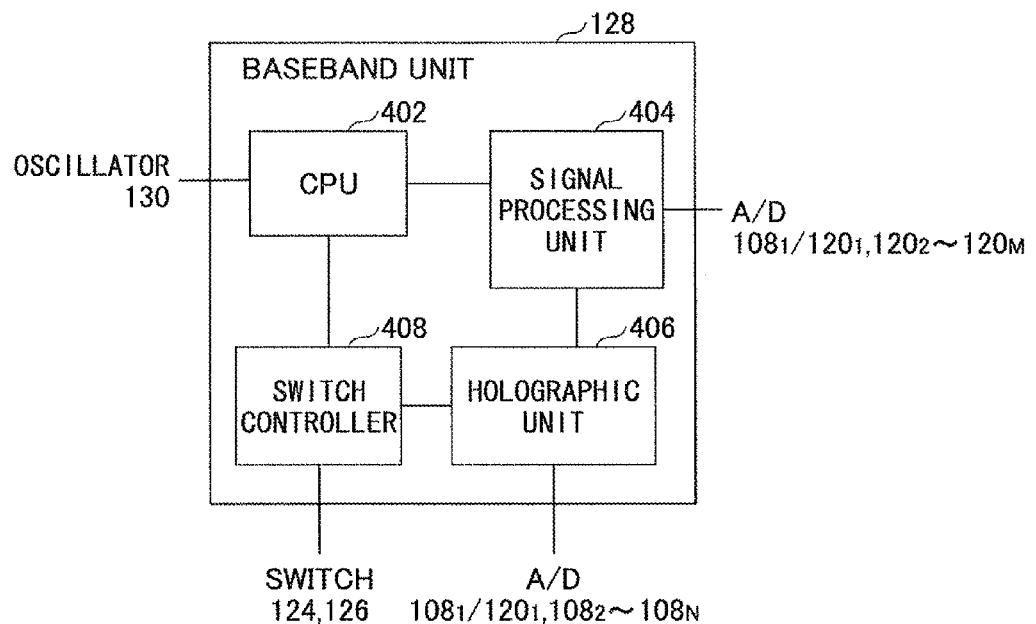
FIG. 4 is a drawing illustrating an exemplary configuration of a baseband unit of a detection and ranging apparatus according to an embodiment.

FIG. 4 is a drawing illustrating an exemplary configuration of the baseband unit 128.

The baseband unit 128 includes a central processing unit (CPU) 402, a signal processing unit 404, a holographic unit 406, and a switch controller 408.

The CPU 402 causes the signal processing unit 404 to perform digital signal processing according to, for example, built-in firmware and/or programs stored in a memory (not shown).

When the transceiver elements $102_1/114_1$ and $102_N$ are used as an array on the X-axis by time sharing, the holographic unit 406 instructs the switch controller 408 so that probe signals are transmitted from the transmitting elements $102_1$ and $102_N$ in sequence. Also, in a time slot occupied by the transceiver elements $102_1/114_1$ and $102_N$, the holographic unit 406 combines echo signals received by N transceiver elements $102_1/114_1$ and $102_2$-$102_N$ using a reference path as an alignment point of spatial phases, and inputs the combined signal to the signal processing unit 404.

The switch controller 408 is connected to the holographic unit 406 and the CPU 402. The switch controller 408 is controlled by the CPU 402. The switch controller 408 changes the positions of the switches 124 and 126 according to instructions from the holographic unit 406.

The signal processing unit 404 is connected to the CPU 402 and the holographic unit 406. The signal processing unit 404 may be implemented by, for example, a digital signal processor (DSP) or a field-programmable gate array (FPGA). The signal processing unit 404 performs baseband signal processing according to instructions from the CPU 402. Based on the digital signals from the A/D converters $108_1/120_1$ and $120_2$-$120_M$ and a signal(s) obtained at the holographic unit 406 by processing the digital signals from the A/D converters $108_1/120_1$ and $108_2$-$108_N$, the signal processing unit 404 obtains azimuth angles θ and elevation angles ϕ and outputs the obtained angles. The holographic processing is optional and the digital signals obtained directly from the A/D converters $108_1/120_1$ and $108_2$-$108_N$ may be used by the signal processing unit 404. The CPU 402 also provides a required control signal to drive the oscillator 130.

<Process Performed by Signal Processing Unit>

An exemplary process performed by the signal processing unit 404 is described in steps 1 through 8 below.

(Step 1)

Two signal vectors are constructed from signals received by N transceiver elements arranged along the X-axis and M transceiver elements arranged along the Z-axis. The signal vectors are expressed by formulas (8) and (9) below with reference to formula (2) that expresses an array antenna characteristic.

$$x(t)=A(\theta,\phi)s(t)+n(t), A(\theta,\phi) \in C^{N \times K} \quad (8)$$

$$z(t)=B(\phi)s(t)+w(t), B(\phi) \in C^{M \times K} \quad (9)$$

Regarding formulas (8) and (9), formulas (10), (11), and (12) are true.

$$A(\theta,\phi) = \begin{bmatrix} g_{11} & \cdots & g_{11} \\ \vdots & \ddots & \vdots \\ g_{N1}\exp\begin{bmatrix} -j2\pi(N-1) \\ \alpha\sin\theta_1\cos\phi_1 \end{bmatrix} & \cdots & g_{N1}\exp\begin{bmatrix} -j2\pi(N-1) \\ \alpha\sin\theta_K\cos\phi_K \end{bmatrix} \end{bmatrix} \quad (10)$$

$$B(\phi) = \begin{bmatrix} g_{11} & \cdots & g_{11} \\ \vdots & \ddots & \vdots \\ g_{1M}\exp\begin{bmatrix} -j2\pi(M-1) \\ \beta\sin\phi_1 \end{bmatrix} & \cdots & g_{1M}\exp\begin{bmatrix} -j2\pi(M-1) \\ \beta\sin\phi_K \end{bmatrix} \end{bmatrix} \quad (11)$$

$$\begin{aligned} x(t) &= [x_{11}(t), \ldots, x_{N1}(t)]^T \\ n(t) &= [n_{11}(t), \ldots, n_{N1}(t)]^T \\ z(t) &= [z_{11}(t), \ldots, z_{1M}(t)]^T \\ w(t) &= [w_{11}(t), \ldots, w_{1M}(t)]^T \\ s(t) &= [s_1(t), \ldots, s_K(t)]^T \end{aligned} \quad (12)$$

Here, for brevity, the angular dependence characteristic of each transceiver element is omitted. In the formulas, s(t) indicates a vector of echo signals from targets, n(t) and w(t) indicate additive white Gaussian noises (AWGN) added to receiving elements arranged along the X-axis and the Z-axis, and $A(\theta, \phi)$ and $B(\phi)$ indicate array response matrices of arrays on the X-axis and the Z-axis. Superscript T in formula (12) and other formulas indicates transposition, and superscript H in formula (13) and other formulas indicates complex conjugate transposition.

Three covariance matrices expressed by formulas (13) through (15) are obtained by removing conjugates from two received signal vectors x(t) and z(t). In the formulas below, "t" indicating time is omitted for brevity. In formulas (13) and (14), $\sigma^2$ indicates average power of the Gaussian noise, and $I_N$ and $I_M$ indicate identity matrices of Nth and Mth orders, respectively. Also, needless to say, $R_{ss}=ss^H$.

$$R_{xx}=xx^H=A(\theta,\phi)R_{ss}A^H(\theta,\phi)+\sigma^2 I_N \quad (13)$$

$$R_{zz}=zz^H=B(\phi)R_{ss}B^H(\phi)+\sigma^2 I_M \quad (14)$$

$$R_{xz}=xz^H=A(\theta,\phi)R_{ss}B^H(\phi)+O_{N \times M} \quad (15)$$

Here, since $R_{xz}$ is a correlation between two independent signals x and z, the noise correlation of $R_{xz}$ becomes approximately zero ($O_{N \times M}$).

(Step 2)

The elevation angle $\phi_k$ (k=1 through K) of each target is estimated by applying a known direction-of-arrival estimation method to a covariance matrix $R_{zz}$ that includes only elevation information ϕ. For example, in Q-ESPRIT (quick estimation of signal parameters via rotational invariance techniques) that is a faster variant of ESPRIT, first and second submatrices are extracted from $R_{zz}$, and an inverse matrix of the first submatrix is calculated based on an assumption that the first submatrix is a nonsingular matrix. Next, a third matrix is calculated by multiplying the inverse matrix of the nonsingular matrix and the second submatrix of $R_{zz}$, eigenvalue decomposition is applied to the third matrix to obtain an eigenvalue, and the angle of the location of the target is calculated based on the eigenvalue. This method derives almost the same angular estimation performance with the well-known TLS-ESPRIT, although just one time eigenvalue calculation is needed. Accordingly, this method makes it possible to significantly reduce the processing load.

(Step 3)

Using the elevation angles $\phi_k$ estimated in step 2, an elevation matrix B is reconstructed. A Hermitian conjugate transpose matrix of the reconstructed elevation matrix B is generated and a generalized inverse matrix $B^{H+}$ of the Hermitian conjugate transpose matrix is calculated according to formula (16).

$$B^{H+}=B(B^H B)^{-1} \quad (16)$$

(Step 4)

Based on the fact that the noise correlation of the correlation $R_{xz}$ between two independent signals x and z becomes approximately zero, $R_{xz}$ is multiplied by $B^{H+}$ from the right as expressed by formula (17).

$$R_{xz}B^{H+} \approx AR_{ss}B^H B(B^H B)^{-1}=AR_{ss} \quad (17)$$

(Step 5)

Formula (18) is obtained by applying QR decomposition to the matrix $R_{xz}B^{H+}$. In formula (18), Q indicates a unitary matrix and R indicates an upper triangular matrix. Since N≥M is assumed, the unitary matrix Q can be divided into a submatrix $Q_s$ corresponding to vectors spanning the signal subspace and a submatrix $Q_N$ corresponding to vectors spanning the noise subspace. Also, a submatrix $R_s$ of the upper triangular matrix R includes signal eigenvalues as diagonal components.

$$AR_{ss} = QR = [Q_s \ Q_n]\begin{bmatrix} R_s \\ 0 \end{bmatrix} = Q_s R_s, Q_s \in C^{N \times K}, \quad (18)$$

$$Q_s \in C^{N \times (N-K)}, R_s \in C^{K \times K}$$

Here, by transforming formula (18), it can be deduced that an unknown matrix T ($=R_s R_{ss}^{-1}$) and the array response matrix A are in a relationship expressed by formula (19).

$$\begin{aligned} J_1 &= [\ I_{N-1} \quad 0\ ] \\ J_2 &= [\ 0 \quad I_{N-1}\ ] \end{aligned} \quad (20)$$

(Step 6)

Formula (20) is derived from an N−1 dimensional diagonal matrix and a zero vector 0 of "N−1"th order.

$$A = Q_s R_s R_{ss}^{-1} \Delta Q_s T^{-1} \quad (19)$$

By applying matrices of formula (20) to the submatrix $Q_s$ of the unitary matrix Q obtained by formula (18), two submatrices expressed by formulas (21) and (22) are obtained.

$$Q_{s1} = J_1 Q_s = J_1 AT = A_1 T, (J_1 A \Delta A_1) \quad (21)$$

$$Q_{s2} = J_2 Q_s = J_2 AT = A_2 T = A_1 PT, (J_2 A \Delta A_2) \quad (22)$$

A matrix P in formula (22) is expressed by formula (23).

$$P = \text{diag}[p_1, \ldots, p_K] = \text{diag}[\exp(-j2\pi\alpha \sin\theta_1 \cos\phi_1), \ldots, \exp(-j2\pi\alpha \sin\theta_K \cos\phi_K)] \quad (23)$$

(Step 7)

$A_1 = Q_{s1} T^{-1}$ is obtained by transforming formula (21). By substituting $A_1 = Q_{s1} T^{-1}$ in formula (22), a similarity transformation problem expressed by formula (24) is obtained.

$$Q_{s2} = A_2 T = A_1 PT = Q_{s1} T^{-1} PT \quad (24)$$

Formula (24) is a basic formula used in ESPRIT (estimation of signal parameters via rotational invariance techniques). Each element $p_k$ (k=1 through K) of the matrix P is calculated according to Q-ESPRIT, LS (least squares)-ESPRIT, or TLS (total least squares)-ESPRIT that is a variant of ESPRIT. Here, when, for example, $Q_{s1}$ is a square matrix, $Q_{s2}$ may be multiplied by $Q_{s1}^{-1}$ from the left to perform eigenvalue decomposition.

(Step 8)

The azimuth angles $\theta_k$ are estimated according to formula (25) using $\phi_k$ obtained in step 2 and $p_k$ obtained in step 7.

$$\theta_k = \sin^{-1}\left[\frac{\arg(p_k)}{2\pi\alpha\cos\phi_k}\right] \quad (25)$$

The signal processing unit 404 outputs the azimuth angles $\theta_k$ and the elevation angles $\phi_k$.

According to the detection and ranging apparatus 100 of the present embodiment, vectors constituting the matrix $Q_s$ are arranged in descending order of eigenvalues at the stage after QR decomposition is applied to the matrix $R_{xz} B^{H+}$. For this reason, it is assumed that the probability of occurrence of pairing errors is low. Also, since $\cos\phi_k \approx 1$ is true unless the elevation angle $\phi_k$ is an extremely large value, it is assumed that an error is small at surrounding the central field of view of a radar.

The signal processing unit 404 may be configured to determine the validity of pairings of elevation angles and azimuth angles based on diagonal elements of the upper triangular matrix obtained in step 5 by applying QR decomposition to the matrix $R_{xz} B^{H+}$ and power indicators, eigenvalues and so on, obtained from the covariance matrix $R_{xx}$ (or $R_{zz}$).

Since the diagonal elements of the upper triangular matrix R obtained by performing QR decomposition on the covariance matrix $R_{xz}$ correspond to the signal power of received signals, the eigenvalues of the covariance matrix $R_{xx}$ (or $R_{zz}$) may be used as indicators to correctly pair elevation information and azimuth information of respective targets. The signal processing unit 404 calculates an evaluation function defined by diagonal elements of a triangular matrix and power indicators (eigenvalues) (for example, the sum of least square distances between the diagonal elements of the upper triangular matrix R corresponding to k=1 through K and the eigenvalues of the covariance matrix $R_{xx}$) and compares the evaluation function with a predetermined threshold to determine the validity of pairings of elevation angles and azimuth angles.

When it is determined that the pairings of elevation angles and azimuth angles are not valid, the signal processing unit 404 solves an algebraic equation that is related to azimuth angles and takes elevation angles estimated based on the covariance matrix $R_{xz}$ as parameters. The signal processing unit 404 determines the valid pairs of the elevation angles and the azimuth angles by solving the algebraic equation.

Since the number of the elevation angles $\phi_k$ estimated in step 2 is K and "K" two-dimensional mode vectors for azimuth angles can be generated by using the elevation angles $\phi_k$ corresponding to k=1 through K, estimation of "K" one-dimensional azimuth angles may be performed using the covariance matrix $R_{xx}$ that includes both azimuth angle information and elevation angle information.

An exemplary method using multiple signal classification (MUSIC) is described below. First, eigenvalue decomposition is performed on the covariance matrix $R_{xx}$ to obtain formula (26).

$$R_{xx} = A R_{ss} A^H + \sigma^2 I_N = E_s \Lambda_s E_s^H + \sigma^2 E_n E_n^H \quad (26)$$

In formula (26), $E_s$ is a matrix composed of vectors spanning the signal subspace, $\Lambda_s$ is a diagonal matrix having eigenvalues corresponding to the vectors of the signal subspace as diagonal elements, and $E_N$ is a matrix composed of eigenvectors spanning the noise subspace.

$$P(\theta, \phi_k) = \frac{a^H(\theta, \phi_k) a(\theta, \phi_k)}{a^H(\theta, \phi_k) E_n E_n^H a(\theta, \phi_k)} \quad (27)$$

Formula (27) defines an angle spectrum used to estimate angle information in two-dimensional MUSIC. Here, since already estimated values are used for the elevation information $\phi_k$, the two-dimensional mode vectors are, as defined by formula (27), practically one-dimensional mode vectors that take $\phi_k$ as parameters to estimate azimuth information. Therefore, estimation needs to be performed at most K times in the azimuth direction. Thus, compared with the related-art method where a two-dimensional angle estimation problem is directly solved, the present embodiment makes it possible to greatly reduce the computational load.

$$a(\theta, \phi_k) = [1, \ldots, \exp(-j2\pi\alpha \sin\theta \cos\phi_k)] \quad (28)$$

In the above described method, an angle spectrum is scanned. Alternatively, up to "K" nonlinear simultaneous equations (formula (29)) that take parameters $\phi_k$ and related to azimuth angles $\theta$ may be solved.

$$\begin{bmatrix} a^H(\theta, \phi_1) \\ \vdots \\ a^H(\theta, \phi_K) \end{bmatrix} E_n E_n^H [a(\theta, \phi_1), \ldots, a(\theta, \phi_K)] = 0 \quad (29)$$

<Oscillator>

Figure 5:
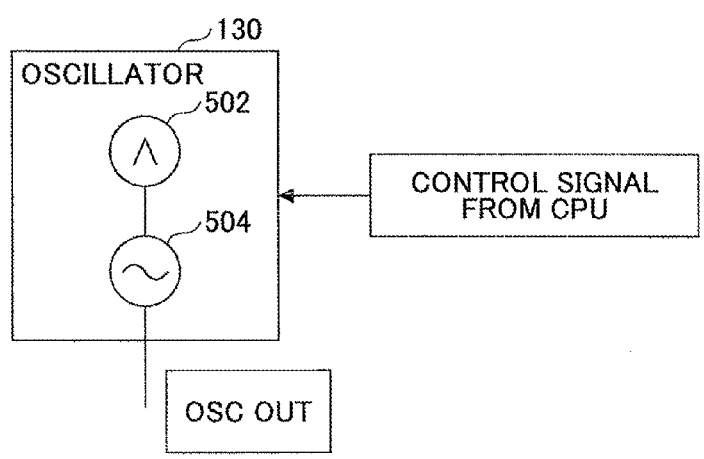
FIG. 5 is a drawing illustrating an exemplary configuration of an oscillator of a detection and ranging apparatus according to an embodiment.

FIG. 5 is a drawing illustrating an exemplary configuration of the oscillator 130 according to the present embodiment.

The oscillator 130 includes a baseband oscillator (BB-OSC) 502 and a radio frequency voltage controlled oscillator (RF-VCO) 504.

For example, the oscillator 130 inputs an output signal of the RF-VCO 504, which is frequency-modulated by a signal from the BB-OSC 502, to the dividers 112 and 122 as the system reference signal. The oscillator 130 also inputs an oscillation signal to the amplifiers $110_1$ and $110_2$ as the probe signal.

<Operations of Detection and Ranging Apparatus>

Figure 6:
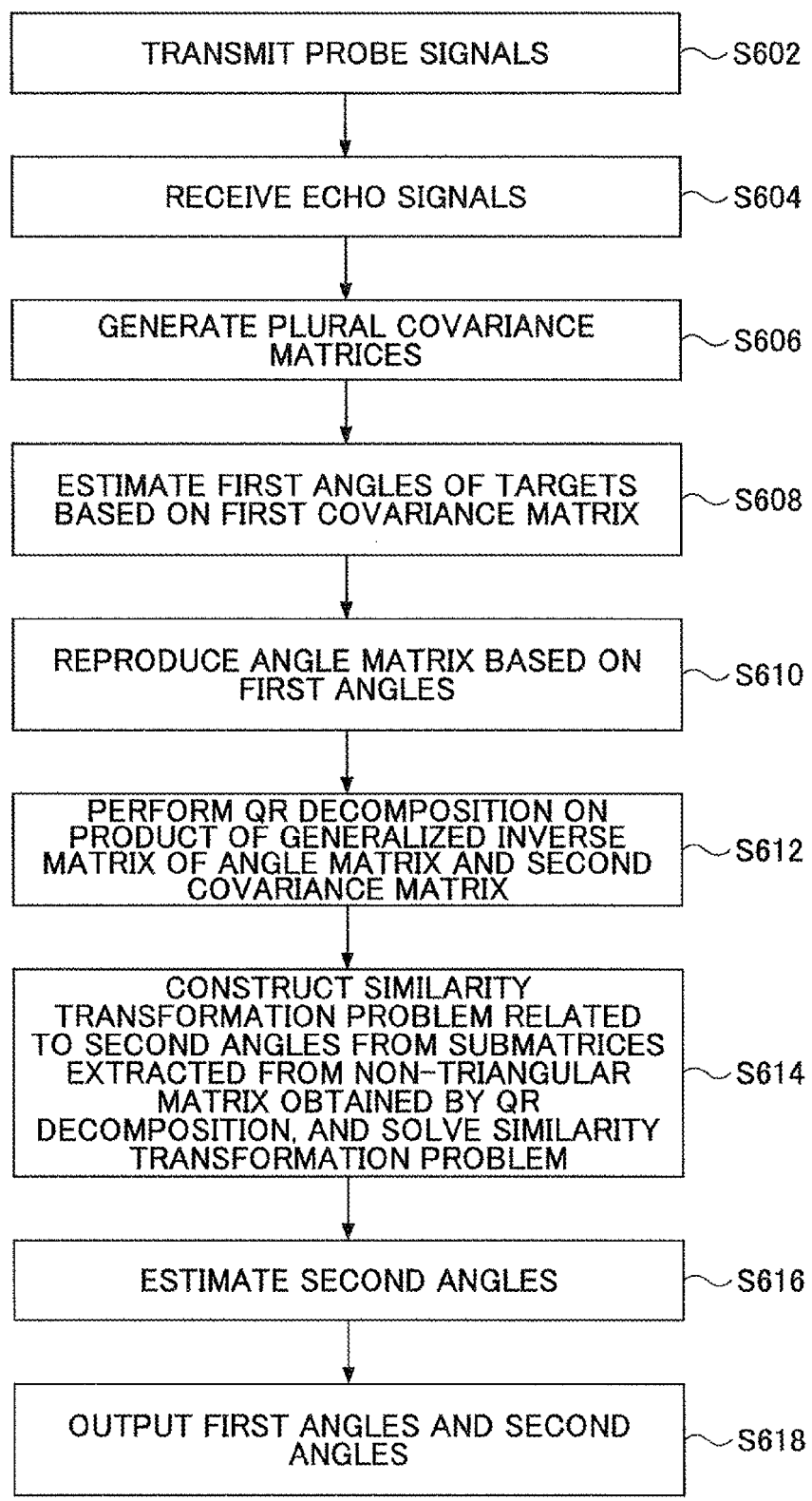
FIG. 6 is a flowchart illustrating exemplary operations of a detection and ranging apparatus according to an embodiment.

FIG. 6 is a flowchart illustrating exemplary operations of the detection and ranging apparatus 100 according to the present embodiment.

At step S602, the CPU 402 controls the detection and ranging apparatus 100 to transmit probe signals from the transceiver elements $102_1$ and $102_N$. Alternatively, when the holographic processing is performed, the holographic unit 406 may control this step.

At step S604, the CPU 402 switches transmission and reception operations (or modes) of the transceiver elements $102_1/114_1$, $102_2$-$102_N$, $102_1/114_1$, and $114_2$-$114_M$ according to a system time chart of a time sharing system (TSS) to receive echo signals via the arrays on the X-axis and the Z-axis, and sends the received echo signals to the signal processing unit 404 (alternatively, when the holographic processing is performed, the echo signals are sent via the holographic unit 406 to the signal processing unit 404).

At step S606, the signal processing unit 404 generates plural covariance matrices.

At step S608, the signal processing unit 404 estimates first angles of targets based on a first covariance matrix of the plural covariance matrices.

At step S610, the signal processing unit 404 reproduces an angle matrix based on the first angles estimated at step S608.

At step S612, the signal processing unit 404 performs QR decomposition on the product of a generalized inverse matrix of the reproduced angle matrix and a second covariance matrix of the plural covariance matrices.

At step S614, the signal processing unit 404 constructs a similarity transformation problem related to second angles by extracting submatrices from a non-triangular matrix obtained by the QR decomposition, and solves the similarity transformation problem using a method such as eigenvalue decomposition to obtain values reflecting second angle information (for example, these values are diagonal elements of a diagonal matrix obtained by the eigenvalue decomposition).

At step S616, the signal processing unit 404 estimates the second angles based on the first angles estimated at step S608 and the values obtained at step S614.

At step S618, the signal processing unit 404 outputs the first angles and the second angles.

An aspect of this disclosure makes it possible to perform two-dimensional angle estimation based on signals obtained by a pair of linear arrays that are not collinear with each other except for an antenna element defining the origin of a spatial phase.

This configuration makes it possible to accurately detect arrival angles of received signals at high speed using sensor arrays.

An aspect of this disclosure also makes it possible to estimate necessary angle information using an apparatus with a minimum configuration including a pair of sensor arrays based on signals obtained by the sensor arrays. Accordingly, the present embodiment makes it possible to provide a detection and ranging apparatus with a small size.

Also according to an aspect of this disclosure, two sets of spatial phase information obtained by a pair of sensor arrays are associated with each other via triangular decomposition. Thus, embodiments of the present invention make it possible to correctly pair elevation angles and azimuth angles. In short, according to embodiments of the present invention, instead of obtaining the whole two-dimensional angle information as solutions of a multidimensional optimization problem, the range of a desired field of view is processed in two stages to estimate two-dimensional angle information at high speed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A detection apparatus, comprising:
   a first array including plural sensors;
   a second array including plural sensors that are not collinear with the sensors of the first array except for one of the sensors that defines an origin of a spatial phase; and
   a hardware processor configured to
      generate a first covariance matrix based on reflected waves received by the second array from targets and generate a second covariance matrix based on reflected waves received by the first array and the second array from the targets,
      estimate first angles of the targets based on the first covariance matrix,
      reproduce an angle matrix based on the estimated first angles,
      perform QR decomposition on a product of a generalized inverse matrix of the reproduced angle matrix and the second covariance matrix to obtain a unitary matrix,
      construct a similarity transformation problem from submatrices of the obtained unitary matrix,
      estimate second angles of the targets based on the estimated first angles and solutions of the similarity transformation problem,
      generate a third covariance matrix based on the reflected waves received by the first array from the targets, and
      determine validity of pairings of the first angles and the second angles based on the first or third covariance matrix and elements of an upper triangular matrix obtained by performing the QR decomposition on the product of the generalized inverse matrix of the reproduced angle matrix and the second covariance matrix.

2. The detection apparatus as claimed in claim 1, wherein when the pairings of the first angles and the second angles are determined to be invalid, the hardware processor is configured to obtain the second angles again by solving an algebraic equation that takes the estimated first angles as parameters or by using mode vectors that take the estimated first angles as parameters, and determine the valid pairs of the estimated first angles and the obtained second angles based on the second covariance matrix and the first or third covariance matrix.

3. The detection apparatus as claimed in claim 1, wherein the first angles are elevation angles and the second angles are azimuth angles.

4. A non-transitory computer-readable storage medium storing a program that causes a processor of a detection apparatus to execute a process, wherein the detection apparatus includes a first array including plural sensors, and a second array including plural sensors that are not collinear with the sensors of the first array except for one of the sensors that defines an origin of a spatial phase, the process comprising:

generating a first covariance matrix based on reflected waves received by the second array from targets and generating a second covariance matrix based on reflected waves received by the first array and the second array from the targets;

estimating first angles of the targets based on the first covariance matrix;

reproducing an angle matrix based on the estimated first angles;

performing QR decomposition on a product of a generalized inverse matrix of the reproduced angle matrix and the second covariance matrix to obtain a unitary matrix;

constructing a similarity transformation problem from submatrices of the obtained unitary matrix;

estimating second angles of the targets based on the estimated first angles and solutions of the similarity transformation problem;

generating a third covariance matrix based on the reflected waves received by the first array from the targets; and determining validity of pairings of the first angles and the second angles based on the first or third covariance matrix and elements of an upper triangular matrix obtained by performing the OR decomposition on the product of the generalized inverse matrix of the reproduced angle matrix and the second covariance matrix.

5. A baseband unit of an apparatus that includes a first array including plural sensors and a second array including plural sensors that are not collinear with the sensors of the first array except for one of the sensors that defines an origin of a spatial phase, the baseband unit comprising:

a hardware processor configured to generate a first covariance matrix based on reflected waves received by the second array from targets and generate a second covariance matrix based on reflected waves received by the first array and the second array from the targets, estimate first angles of the targets based on the first covariance matrix, reproduce an angle matrix based on the estimated first angles, perform QR decomposition on a product of a generalized inverse matrix of the reproduced angle matrix and the second covariance matrix to obtain a unitary matrix, construct a similarity transformation problem from submatrices of the obtained unitary matrix, estimate second angles of the targets based on the estimated first angles and solutions of the similarity transformation problem, generate a third covariance matrix based on the reflected waves received by the first array from the targets, and determine validity of pairings of the first angles and the second angles based on the first or third covariance matrix and elements of an upper triangular matrix obtained by performing the QR decomposition on the product of the generalized inverse matrix of the reproduced angle matrix and the second covariance matrix.

* * * * *